(12) United States Patent
Tuffs

(10) Patent No.: US 10,807,503 B2
(45) Date of Patent: Oct. 20, 2020

(54) SEAT TRACK ASSEMBLY INCLUDING COVER MEMBERS

(71) Applicant: Ford Global Technologies, LLC, Dearborn, MI (US)

(72) Inventor: Shawn Tuffs, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/291,251

(22) Filed: Mar. 4, 2019

(65) Prior Publication Data

US 2020/0282869 A1  Sep. 10, 2020

(51) Int. Cl.
*B60N 2/07* (2006.01)
*B60N 2/06* (2006.01)

(52) U.S. Cl.
CPC ............. *B60N 2/0725* (2013.01); *B60N 2/06* (2013.01); *B60N 2/0722* (2013.01); *B60N 2/0732* (2013.01)

(58) Field of Classification Search
CPC .. B60N 2/0725; B60N 2/0732; B60N 2/0722; B60N 2/06
USPC ....................................... 296/65.13
See application file for complete search history.

(56) References Cited

U.S. PATENT DOCUMENTS

| 5,188,329 A | 2/1993 | Takahara |
| 5,275,369 A | 1/1994 | Kamata et al. |
| 5,606,903 A | 3/1997 | Drittel |
| 6,145,911 A * | 11/2000 | Sturt ...................... B60N 2/071 296/65.01 |
| 7,073,764 B2 | 7/2006 | Matsushiro |
| 7,350,853 B2 * | 4/2008 | Fitze ...................... B62D 25/20 296/184.1 |
| 7,726,730 B2 * | 6/2010 | Peter ...................... B60N 2/071 296/65.13 |
| 2007/0170743 A1 * | 7/2007 | Kinoshita ............ B60N 2/0818 296/65.13 |

FOREIGN PATENT DOCUMENTS

| DE | 102009056414 A1 | 6/2011 |
| DE | 102016207030 A1 | 10/2017 |

* cited by examiner

Primary Examiner — Joseph D. Pape
(74) Attorney, Agent, or Firm — David Coppiellie; Price Heneveld LLP

(57) ABSTRACT

A vehicle includes an outer rail coupled to a floor. An inner rail is positioned within the outer rail. A seat base is coupled to the inner rail. Cover members are positioned over the outer rail. An inclined member is coupled to the outer rail and the cover members are configured to pivot about two rotational axes in response to movement of the inclined member.

19 Claims, 12 Drawing Sheets

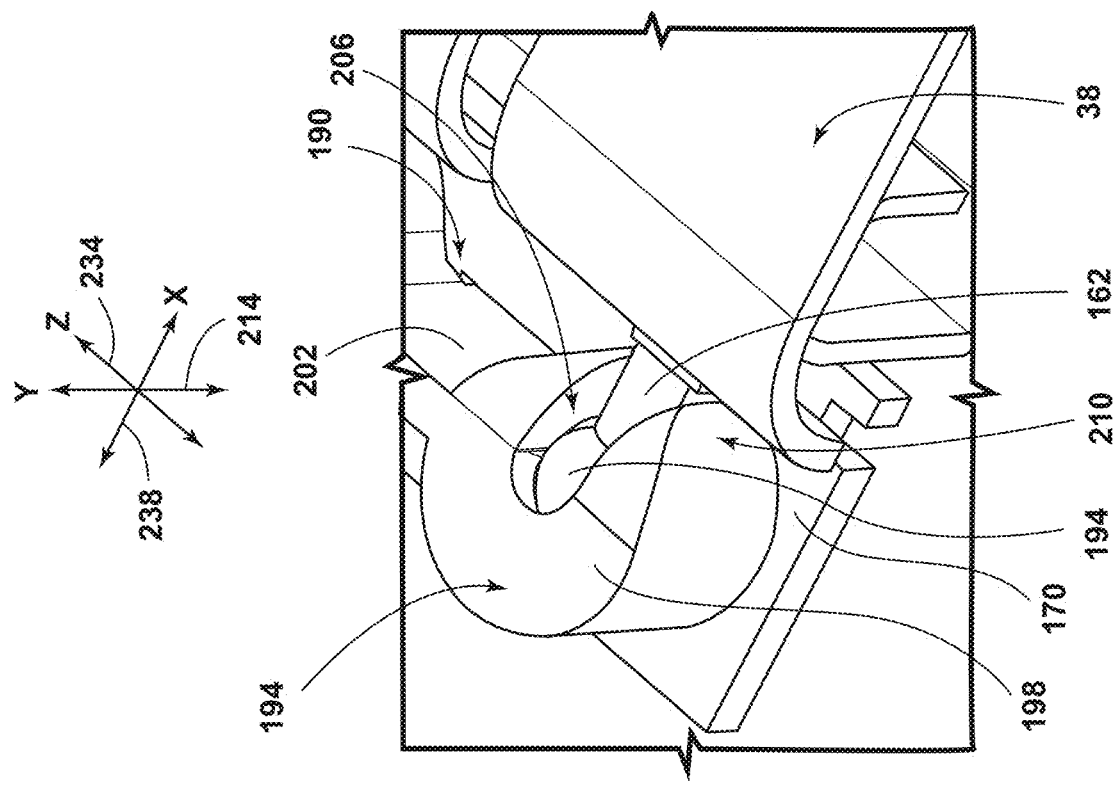
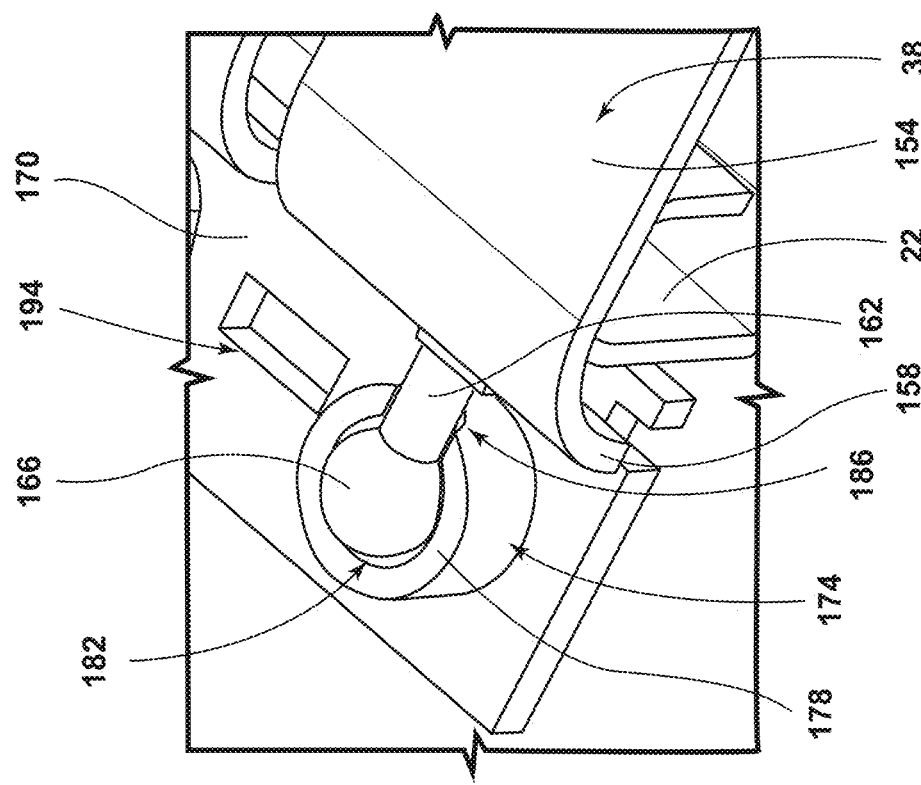
FIG. 5
FIG. 4

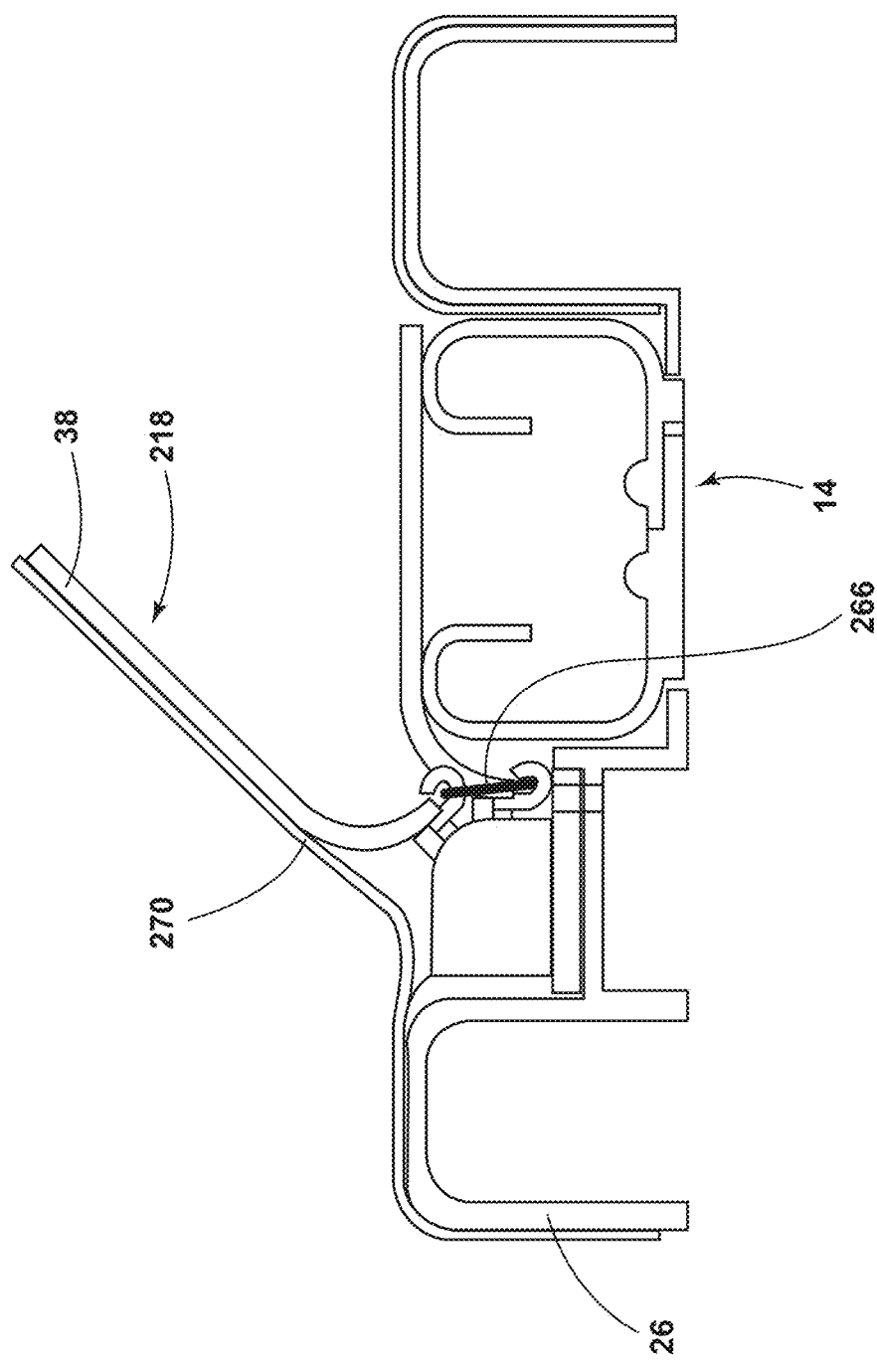

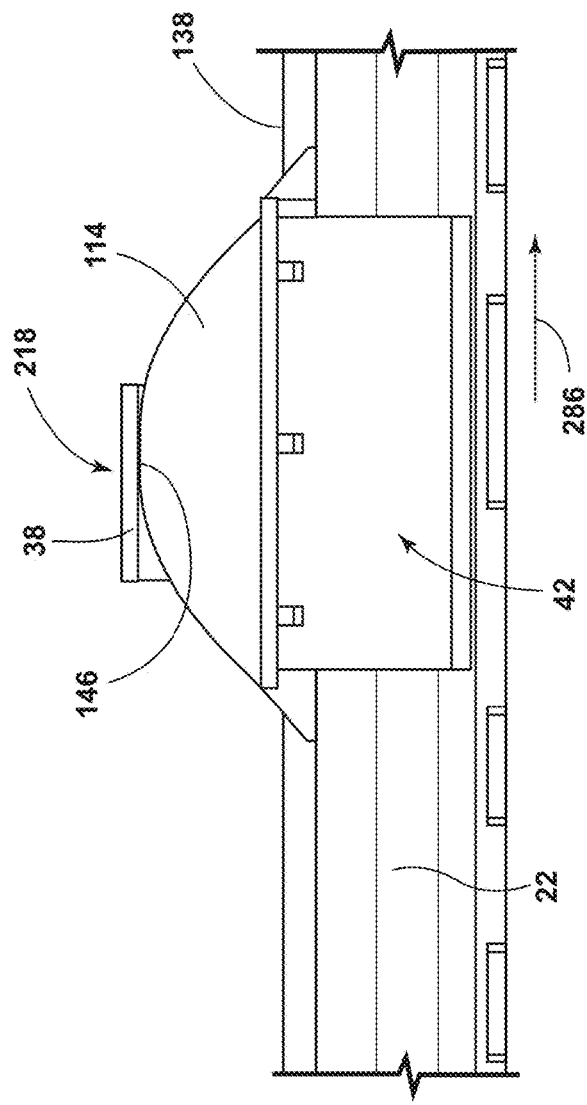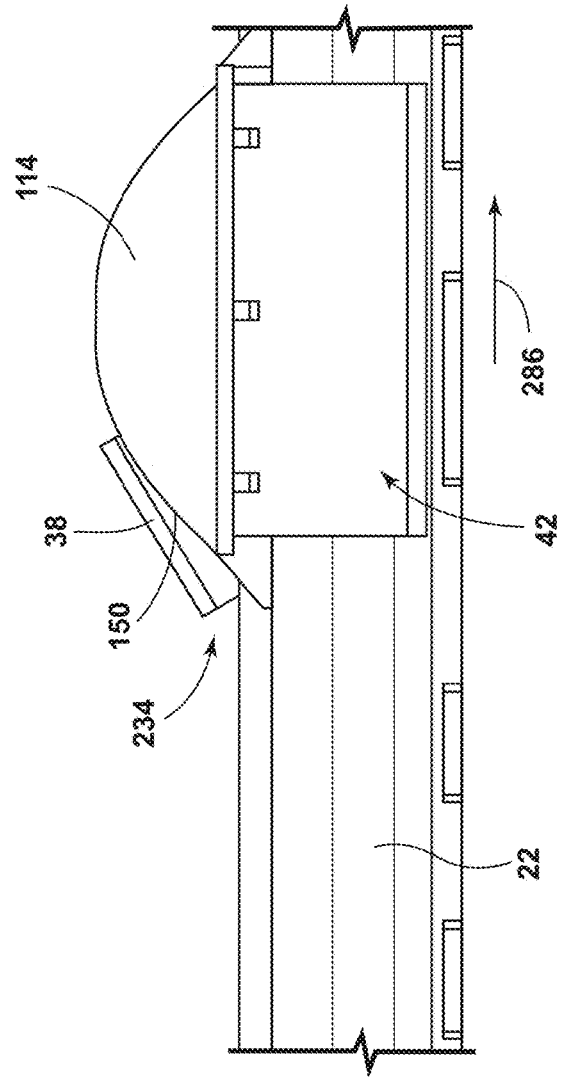

SEAT TRACK ASSEMBLY INCLUDING COVER MEMBERS

FIELD OF THE DISCLOSURE

The present disclosure generally relates to a seat track assembly. More specifically, the present disclosure relates to a vehicle seat track assembly including cover members.

BACKGROUND

Conventional rail assemblies for moving vehicle seats in a longitudinal direction may be positioned at least partially above the vehicle floor. The rail assemblies may then be an unsightly appearance within the passenger compartment of the vehicle. Further, the conventional rail assemblies may be an obstacle for passengers to walk over.

SUMMARY OF THE DISCLOSURE

According to at least one aspect of the present disclosure, a vehicle includes an outer rail coupled to a floor. An inner rail is positioned within the outer rail. A seat base is coupled to the inner rail. Cover members are positioned over the outer rail. An inclined member is coupled to the outer rail and the cover members are configured to pivot about two rotational axes in response to movement of the inclined member.

According to another aspect of the present disclosure, a track assembly for a vehicle seat includes an outer rail and an inner rail positioned within the outer rail. An inclined member is coupled to the inner rail. A support base is positioned adjacent to the outer rail and defines sockets. Cover members are positioned over the outer rail and include rounded pivot members. The cover members pivot about two rotational axes.

According to another aspect of the present disclosure, a track assembly for a vehicle seat includes an outer rail and an inner rail positioned within the outer rail. A support base is positioned adjacent to the outer rail and defines sockets. Cover members are positioned over the outer rail and comprise rounded pivot members position within the sockets.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 4 is a partial top perspective view of the cover members having a rounded pivot member, according to one example;

FIG. 5 is a partial top perspective view of a retaining member positioned over the rounded pivot member, according to one example;

FIG. 8B is a front view of the track assembly having the floor covering, according to one example;

FIG. 10C is a cross-sectional view taken along line X-X of FIG. 7 of the cover member in a raised position; and FIG. 10D is a cross-sectional view taken along line X-X of FIG. 7 of the cover member in a second angled position.

DETAILED DESCRIPTION OF THE PREFERRED EMBODIMENTS

Figure 1A:
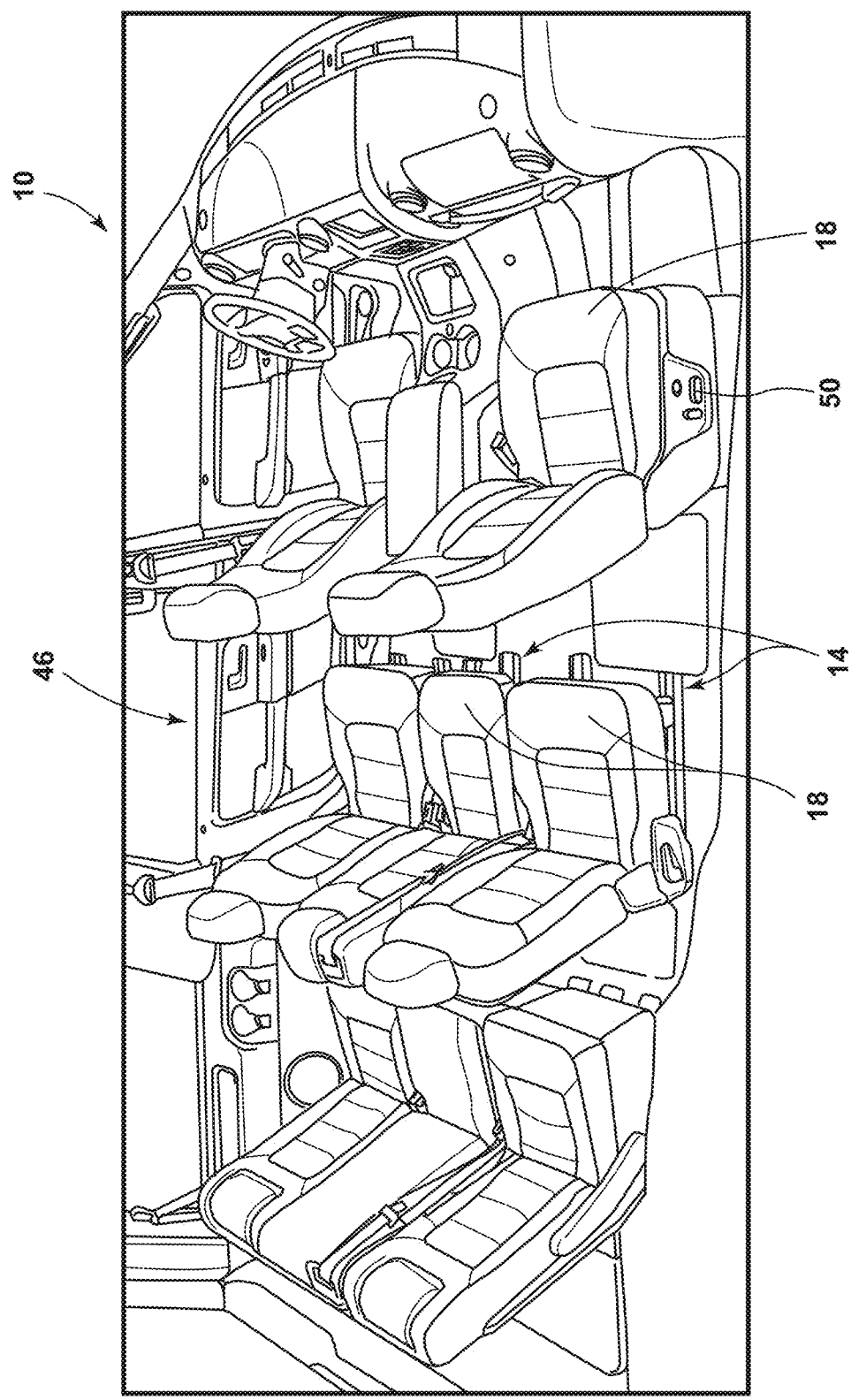
FIG. 1A is a partial side perspective view of an interior of a vehicle equipped with vehicle seats, according to one example.

Additional features and advantages of the invention will be set forth in the detailed description which follows and will be apparent to those skilled in the art from the description, or recognized by practicing the invention as described in the following description, together with the claims and appended drawings.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1A-10D, reference numeral 10 generally designates a vehicle having a track assembly 14 for a seat 18. An outer rail 22 is coupled to a floor 26 and an inner rail 30 is positioned within the outer rail 22. A seat base 34 is coupled to the inner rail 30. Cover members 38 are positioned over the outer rail 22. An inclined member 42 is coupled to the inner rail 30. The cover members 38 are configured to pivot about two rotational axes in response to movement of the inclined member 42. Referring to FIG. 1A, an interior of the vehicle 10 is shown having a plurality of seats 18 arranged in a first front seating row 58, a second middle seating row 62, and a third rear seating row 70. The vehicle 10 may be equipped with one or more seats 18. Each seat 18 is coupled to the track assembly 14. The seats 18 move along the track assembly 14 in a longitudinal direction. As illustrated, the track assembly 14 is oriented to allow the seats 18 to move in a vehicle fore-aft direction. However, it is contemplated that the track assembly 14 may be oriented to allow the seats 18 to move in different directions within the vehicle 10. In various examples, the seats 18 may include an adjustment member 50 for moving the seats 18 forwards or backwards along the track assembly 14. The adjustment member 50 may provide for manually moving the seat 18, or may be a powered adjustment member 50. The track assembly 14 may be installed in various types of vehicles 10, such as, for example, sedans, trucks, sport utility vehicles, and/or crossovers. Based on the position of the seat 18, the track assembly 14 may be exposed in a vehicle-forward and/or vehicle-rearward direction of the seat 18

Figure 1B:
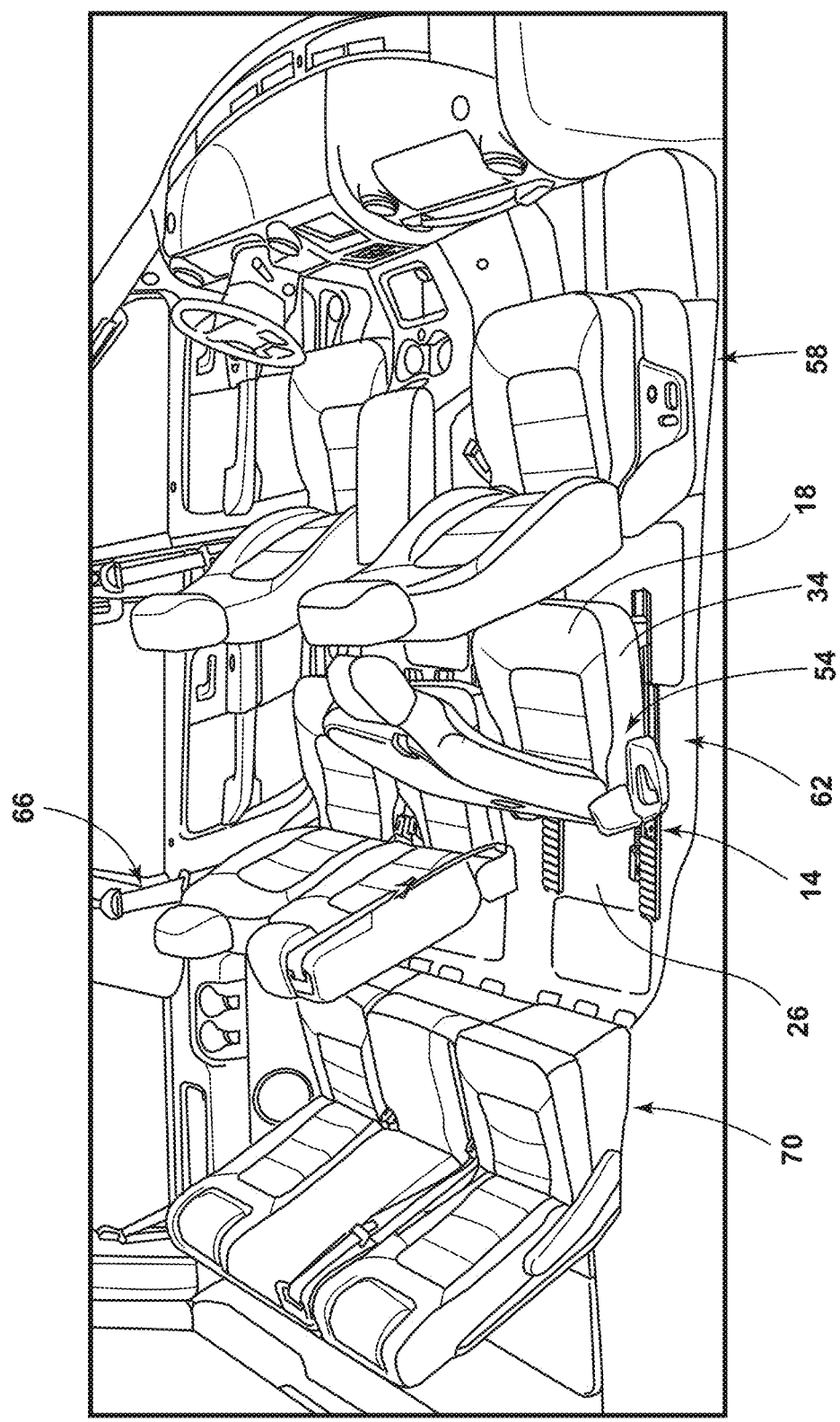
FIG. 1B is a partial side perspective view of the interior of the vehicle, according to one example.

Referring to FIG. 1B, the seat 18 is shown in a folded position 54. When in the folded position 54 the track assembly 14 is further exposed. In various examples, the track assembly is positioned in the first seating row 58, the second seating row 62, and/or any additional seating rows within the vehicle 10. The seats 18 may be moved into the folded position 54 to allow passengers to reach a more vehicle-rearward seating row. As illustrated, there is a door opening 66 proximate the second seating row 62, but no door opening 66 proximate a third seating row 70. Accordingly, a passenger would move the seat 18 in the second seating row 62 to the folded position 54 and move over the track assembly 14 to reach the seat 18 in the third seating row 70.

Figure 2:
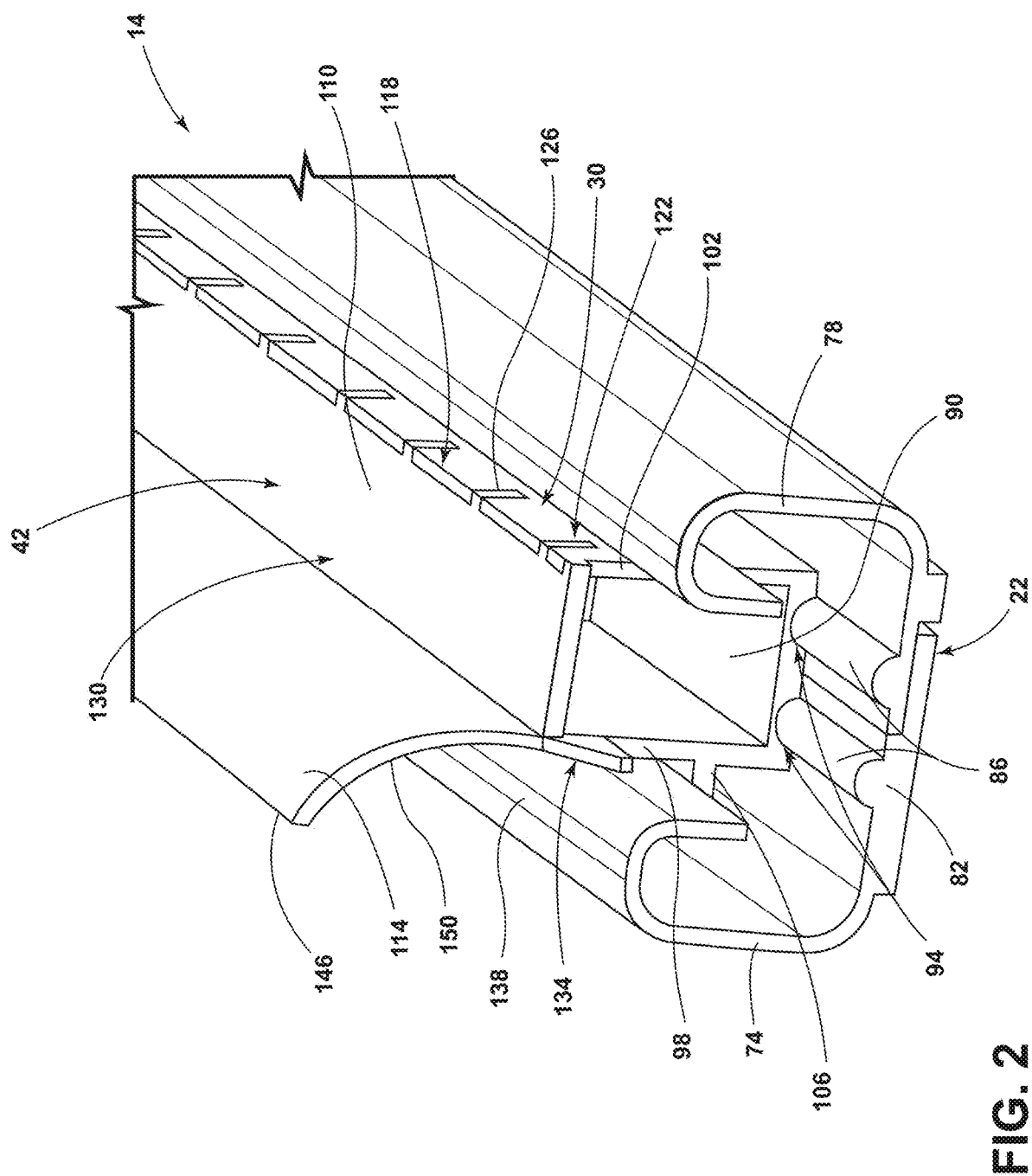
FIG. 2 is a partial front perspective view of a track assembly for a vehicle seat in the vehicle, according to one example.

Referring to FIGS. 1B and 2, the track assembly 14 includes the outer rail 22 and the inner rail 30. The outer rail 22 is coupled to the floor 26 of the vehicle 10. The inner rail 30 is positioned within the outer rail 22. Additionally, the seat base 34 is coupled to the inner rail 30. In operation, the inner rail 30 moves in the longitudinal direction within the outer rail 22. As a result, the seat 18 moves with the inner rail 30.

Referring to FIG. 2, the outer rail 22 includes a left C-shaped portion 74 and a right C-shaped portion 78 and an outer base 82 positioned therebetween. The outer base 82, as illustrated, includes ribs 86 extending longitudinally across the outer base 82. The example illustrated in FIG. 2 depicts two ribs 86 integrally formed with the outer base 82. However, it is contemplated that more or less ribs 86 may be included on the outer base 82. It is also contemplated that the ribs 86 may be separate components coupled to the outer base 82. The left and right C-shaped portions 74, 78 curve inwards towards the opposing C-shaped portion and downwards towards the outer base 82. It is also contemplated that the left and right C-shaped portions 74, 78 may be, for example, semi-circular, L-shaped, or J-shaped. The outer rail 22 may be a single continuous component or may be more than one component coupled together.

The inner rail 30 is positioned within the outer rail 22. In various examples, the inner rail 30 has a substantially similar length as the outer rail 22. An inner base 90 is positioned on the outer base 82. In various examples, the inner base 90 defines grooves 94 that are configured to align with the ribs 86 of the outer base 82. Accordingly, the inner base 90 may define the same number of grooves 94 as ribs 86 on the outer base 82. It may be advantageous to include the ribs 86 and grooves 94 to guide the inner rail 30 along a linear path without the inner rail 30 angling within the outer rail 22. The inner rail 30 has a width less than a width of the outer rail 22, such that left and right sidewalls 98, 102 of the inner rail 30 are spaced apart from the left and right C-shaped portions 74, 78 of the outer rail 22. The inner rail 30 may include coupling members 106 extending outwards from the left and right sidewalls 98, 102. The coupling members 106 may cooperate with the left and right C-shaped portions 74, 78 of the outer rail 22 to assist in guiding the inner rail 30.

Referring still to FIG. 2, the inclined member 42 is coupled to the inner rail 30. In various examples, the inclined member 42 includes a horizontal portion 110 and an arcuate portion 114. As illustrated, the horizontal portion 110 is coupled to a top portion 118 of the inner rail 30 and extends between the left and right sidewalls 98, 102. The left and right sidewalls 98, 102 may define notches 122 configured to receive projections 126 extending from the horizontal portion 110. The notches 122 and projections 126 may be advantageous in coupling the inclined member 42 to the inner rail 30. It is also contemplated the inclined member 42 may be coupled to the inner rail 30 by, for example, fasteners or adhesives. As illustrated, the arcuate portion 114 is coupled to a left edge portion 130 of the horizontal portion 110. The arcuate portion 114 extends below the horizontal portion 110. Further, a lower portion 134 of the arcuate portion 114 is positioned below an upper surface 138 of the outer rail 22. In various examples, the lower portion 134 is positioned below the upper surface 138 of the left C-shaped portion 74. The arcuate portion 114 curves outward over the left C-shaped portion 74 of the outer rail 22. The arcuate portion 114 includes a first angled edge 142 (FIG. 7), a top edge 146, and a second angled edge 150. The first and second angled edges 142, 150 are inclined inwards to the opposing angled edge. Additionally, the top edge 146 may be substantially parallel to the inner rail 30.

Figure 3:
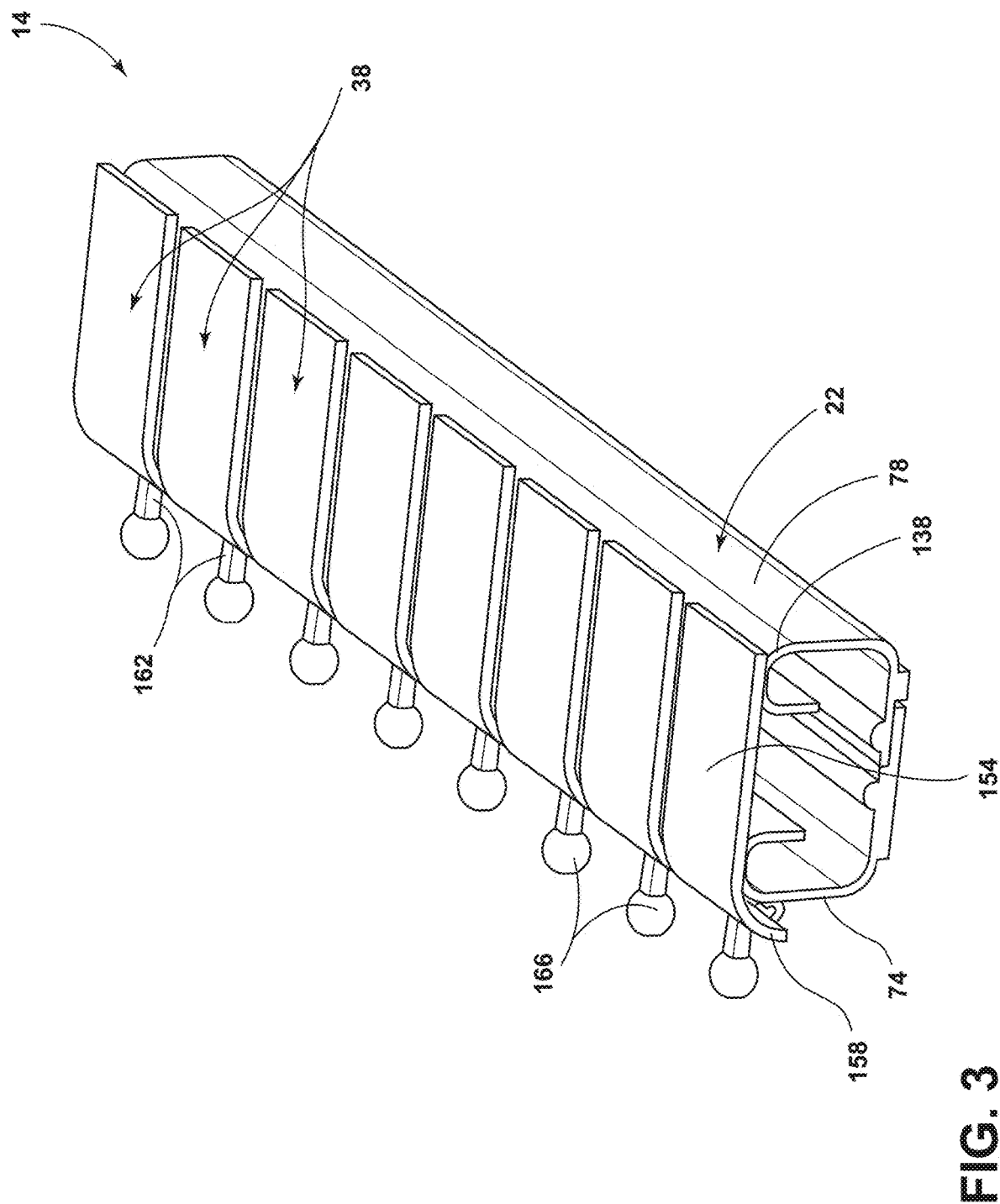
FIG. 3 is a top perspective view of the track assembly including cover members, according to one example.

Referring to FIG. 3, the track assembly 14 includes the cover members 38 positioned over the outer rail 22. In various examples, the track assembly 14 may include a plurality of cover members 38. The cover members 38 are positioned on the upper surfaces 138 of the left and right C-shaped portions 74, 78. Each cover member 38 has a body 154 with a rounded end portion 158. The rounded end portions 158 curve around the left C-shaped portion 74, following the shape of the outer rail 22. As illustrated, each cover member 38 includes an elongated support 162 extending outwards from the rounded end portion 158. In various examples, the elongated supports 162 extend substantially horizontal from the rounded end portion 158. Each of the elongated supports 162 include a rounded pivot member 166. The rounded pivot members 166, as illustrated, are spheroid shaped. However, it is contemplated that the rounded pivot members 166 may be pyramidal, square, rectangular, or any other higher order geometric shapes. In such examples, edges of the rounded pivot members 166 may be beveled to assist in the pivoting movement of the cover members 38. Each of the rounded pivot members 166 may be substantially the same shape and/or size.

Referring still to FIG. 3, the cover members 38 may be spaced apart from adjacent cover members 38. The cover members 38 may be advantageous for protecting debris and other materials from entering the track assembly 14. Accordingly, openings defined between adjacent cover members 38 may be a sufficient size to allow independent movement of each cover member 38 while still preventing debris from entering the track assembly 14. In various examples, the cover members 38 may include, for example, metals, metal alloys, and/or plastics.

Referring now to FIG. 4, a support base 170 is positioned adjacent to the outer rail 22. The support base 170 may extend the entire length of the outer rail 22. The support base 170, as illustrated, includes protrusions 174 extending vertically upwards. The protrusions 174 may each include an outer wall 178 defining a socket 182. In other words, the protrusions 174 of the support base 170 may define sockets 182. In various examples, the support base 170 may define a plurality of sockets 182. Additionally or alternatively, the number of sockets 182 may be the same or substantially similar as the number of cover members 38. The protrusions 174 and/or the sockets 182 may be spaced apart at even intervals to align with the cover members 38. Each of the outer walls 178 may define an indent 186 to accommodate the elongated supports 162 of the cover members 38. The indents 186 may allow the rounded end portions 158 to be positioned in the sockets 182 and the bodies 154 of the cover members 38 to rest substantially horizontal across the outer rail 22, simultaneously. The sockets 182 may have a greater width and length compared to the rounded pivot members 166, such that the rounded pivot members 166 may pivot and/or rotate within the sockets 182. In other words, the rounded pivot members 166 and the sockets 182 may operate as a ball-and-socket joint. In various examples, the support base 170 may define apertures 190 between the protrusions 174. The apertures 190 may be configured to couple a retaining member 194 (FIG. 5) to the support base 170. The support base 170 may define the apertures 190 between all adjacent protrusions 174 or between some of the adjacent protrusions 174.

Referring now to FIG. 5, the retaining member 194 may be coupled to the support base 170. As illustrated, the retaining member 194 is positioned over the rounded pivot members 166 when the rounded pivot members 166 are positioned within the sockets 182 (FIG. 4). The retaining member 194 may be substantially the same width and shape for the entire length of the retaining member 194. Alternatively, the retaining member 194 may have housing portions 198 positioned over the sockets 182 coupled via connection portions 202 that have a width less than the width of the housing portions 198. The connection portions 202 may be positioned between and couple adjacent housing portions 198. In various examples, the connection portions 202 may extend through the apertures 190 defined by the support base 170 to couple the retaining member 194 to the support base 170. In some examples, each connection portion 202 extends through the apertures 190. Alternatively, in other examples, some of the connection portions 202 may extend through the apertures 190. As illustrated, the housing portions 198 each define a slot 206 on a right side portion 210 of the housing portion 198 (e.g., adjacent to the outer rail 22). The slots 206 may accommodate the elongated supports 162 of the cover members 38. The elongated supports 162 are configured to move through the slots 206. The slots 206 are configured to allow the cover members 38 to be raised to approximately 90°. The slots 206 may also prevent the cover members 38 from pivoting about a vertical axis 214 (e.g., pivoting laterally). As illustrated, the first vertical axis 214 is the y-axis.

Figure 6A:
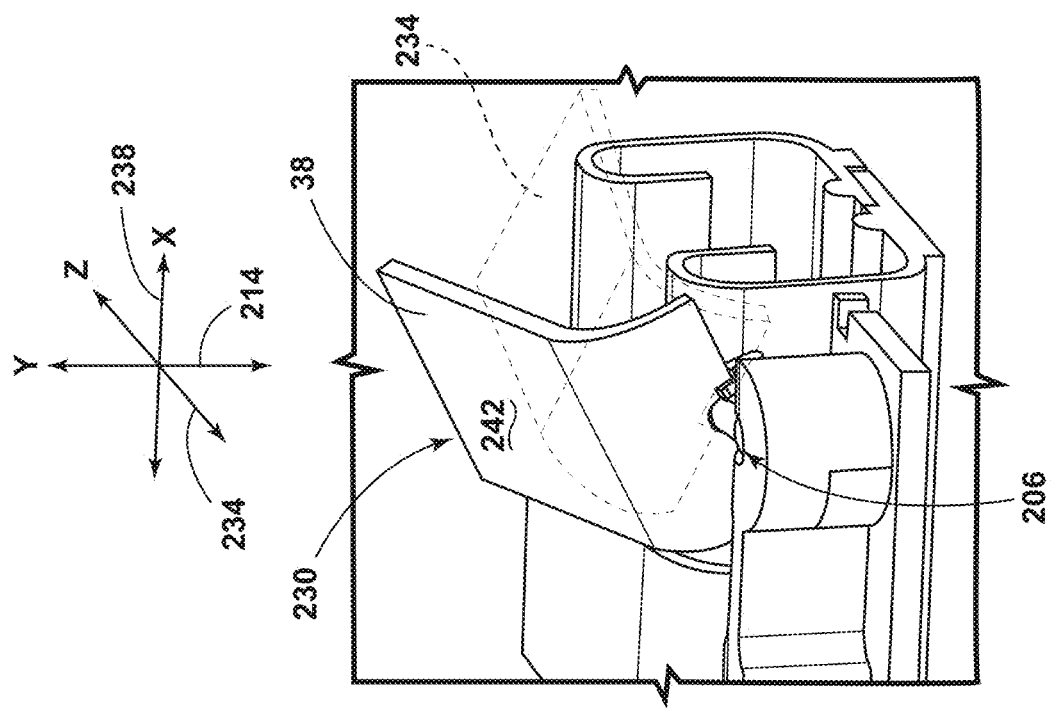
FIG. 6A is a partial side view of the cover member rotated about a first horizontal axis, according to one example.

Referring now to FIG. 6A, the cover members 38 may be configured to pivot about two rotational axes. As illustrated in FIG. 6A, the cover members 38 are operable between a raised position 218 and a lowered position 222. Accordingly, the cover members 38 may rotate about a first horizontal axis 226. As illustrated, the first horizontal axis 226 is the x-axis. The lowered position 222 may be substantially parallel with the outer base 82 and the raised position 218 may be substantially perpendicular to the outer base 82 (e.g., substantially vertical). The raised position 218 may also be any angle in a range of from about 5° to about 90°, in a specific example. The slots 206 and the retaining member 194 may prevent the cover member 38 from pivoting more than about 90° about the first vertical axis 214. It may be advantageous to prevent the cover members 38 from exceeding 90° to prevent the cover members 38 from remaining fixed in the raised position 218.

Figure 6B:
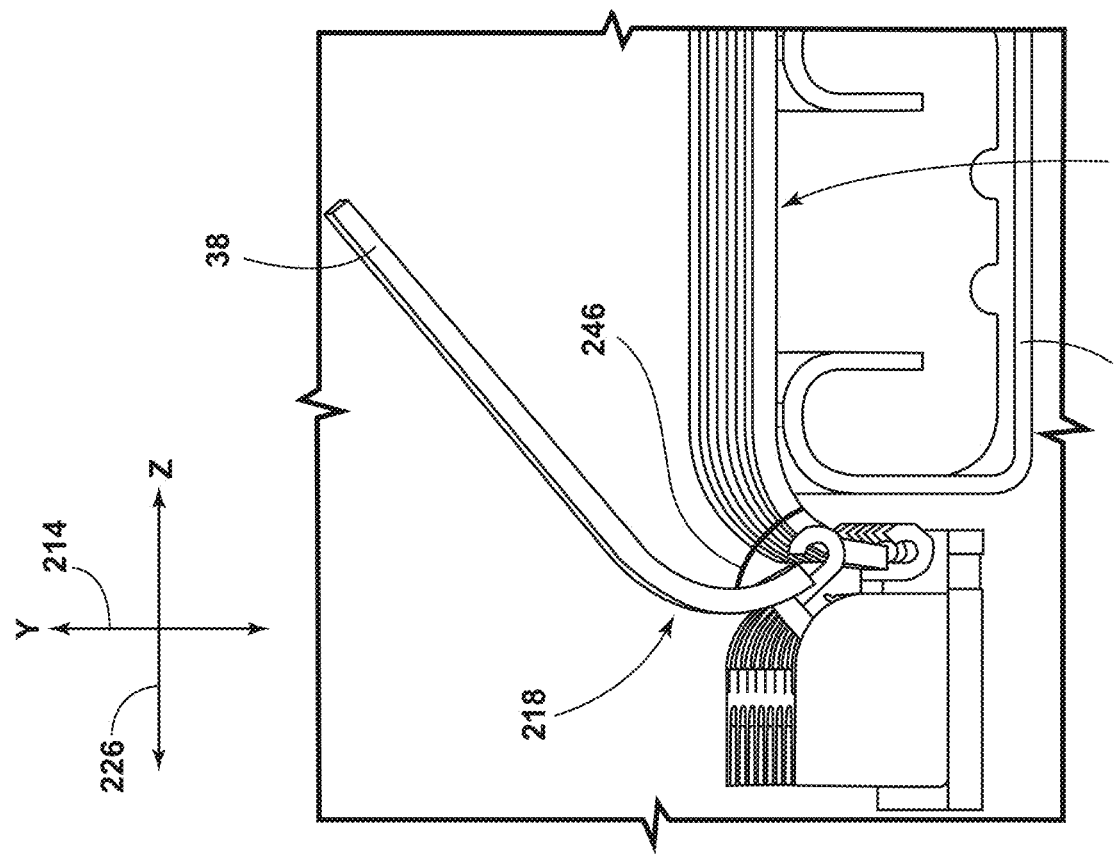
FIG. 6B is a partial side perspective view of the cover member rotated about a second horizontal axis, according to one example.

As illustrated in FIG. 6B, the cover members 38 are operable between a first angled position 230 and a second angled position 234. Accordingly, the cover members 38 may be configured to pivot about a second horizontal axis 238. As illustrated, the second horizontal axis 238 is the z-axis. The cover members 38 may rotate about 180° about the second horizontal axis 238. As such, the cover members 38 may be configured to rotate to a position where a top surfaces 242 of the cover members 38 face a vehicle-forward direction when in the first angled position 230 and where the top surfaces 242 face a vehicle-rearward direction when in the second angled position 234. In other words, the cover members 38 may be configured to rotate about 90° in a vehicle-forward direction and about 90° in a vehicle-rearward direction. The first and second angled positions 230, 234 may be less than 90° in the vehicle-forward and vehicle-rearward directions, respectively. In such examples, the first and second angled positions 230, 234 may be in a range of from about 5° to about 90° in each of the vehicle-forward direction and vehicle-rearward direction, respectively, (e.g., about the second horizontal axis 238). As illustrated, the slots 206 allow the cover members 38 to rotate about the first horizontal axis 226 (e.g., between the raised and lowered positions 218, 222) and about the second horizontal axis 238 (e.g., between the first and second angled positions 230, 234), but prevent the cover members 38 from rotating about the vertical axis 214 (e.g., laterally).

Referring to FIGS. 6A and 6B, each cover member 38, as illustrated, is configured to move independently of adjacent cover members 38. However, it may be contemplated that adjacent cover members 38 are coupled via linkages 246. The linkages 246 may be flexible, such that the cover members 38 may not move as a single unit and still permit each cover member 38 to rotate between the first and second angled positions 230, 234. The linkages 246 may assist the cover members 38 in moving between the raised and lowered positions 218, 222. In various examples, as the cover member 38 moves to the raised position 218 and reaches a predetermined angle, the linkage 246 may begin moving the adjacent cover member 38 to the raised position 218.

In various examples, the first horizontal axis 226 may be at an angle relative to the second horizontal axis 238. The angle between the first and second horizontal axes 226, 238 may be, in a specific example, a range of from about 30° to about 90°. The first and second horizontal axes 226, 238 may also be at an angle compared to the first vertical axis 214. The angle between the vertical axis 214 and each of the first and second horizontal axes 226, 238 may be in a range of from about 30° to about 90°. The angle between each of the first and second horizontal axes 226, 238 and the vertical axis 214 may all be a substantially similar angle. Alternatively, two of the three angles may be substantially similar, or all of the angles may not be substantially similar.

Figure 7:
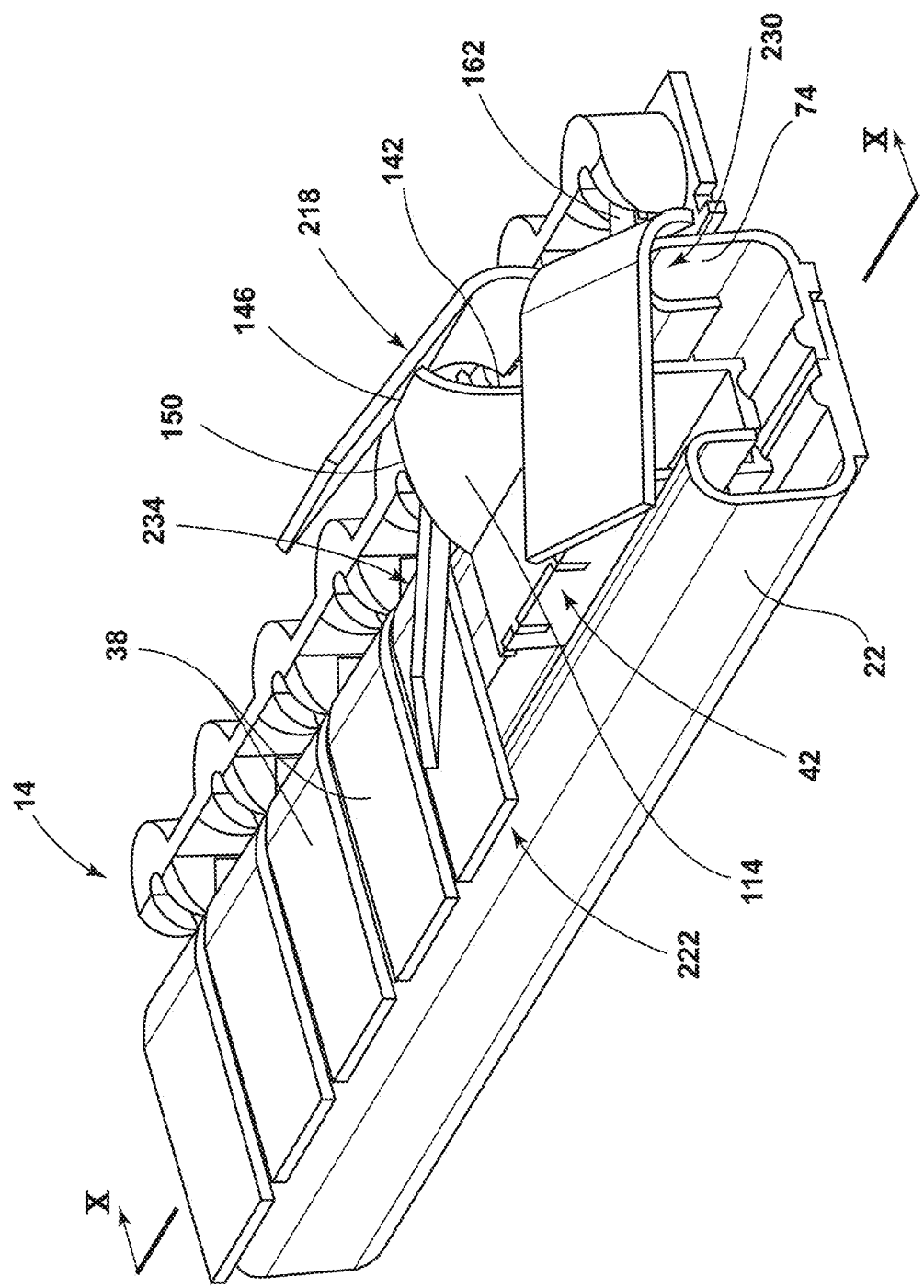
FIG. 7 is a side perspective view of the track assembly having an inclined member, according to one example.

Referring now to FIG. 7, as previously explained, the inclined member 42 moves in the longitudinal direction along the outer rail 22. As illustrated, the cover members 38 are configured to move in response to the inclined member 42 moving in the longitudinal direction within the outer rail 22. The first angled edge 142 of the arcuate portion 114 moves the cover members 38 to the first angled position 230 and begins to move the cover members 38 to the raised position 218. The top edge 146 of the arcuate portion 114 moves the cover members 38 to the raised position 218. The second angled edge 150 of the arcuate portion 114 moves the cover members 38 to the second angled position 234 and begins to move the cover members 38 to the lowered position 222. Accordingly, the arcuate portion 114 may be on the same side of the track assembly 14 as the elongated supports 162 of the cover members 38 (e.g., proximate the left C-shaped portion 74 of the outer rail 22) to allow the arcuate portion 114 to move the cover members 38 in the desired directions. It is contemplated that the arcuate portion 114 and the elongated supports 162 may both be positioned proximate the right C-shaped portion 78 of the outer rail 22 without deviating from the teachings herein.

Figure 8A:
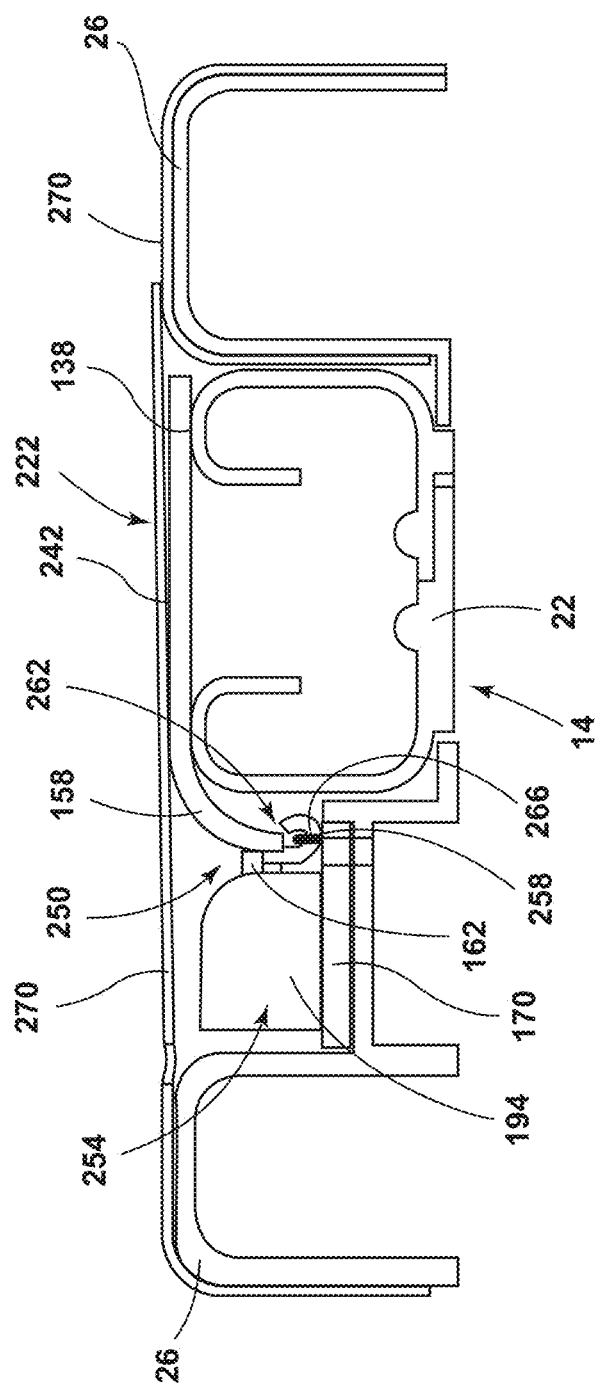
FIG. 8A is a front view of the track assembly having a floor covering positioned over the cover members, according to one example.

Referring now to FIG. 8A, the upper surface 138 of the outer rail 22 may be substantially flush with the surrounding floor 26 of the vehicle 10. In various example, the top surfaces 242 of the cover members 38 may be substantially flush with the surrounding floor 26. Accordingly, the floor 26 defines a cavity 250 in which the track assembly 14 is positioned. The support base 170 and the retaining member 194 may be positioned within the cavity 250. However, in various examples, the support base 170 and the retaining member 194 may be positioned above the outer base 82 of the outer rail 22, such that an upper portion 254 of the retaining member 194 may be substantially horizontally aligned with the upper surface 138 of the outer rail 22. As such, the floor 26 may have multiple thicknesses. In various examples, the floor 26 may include, metals or metal alloys. In a specific example, the floor 26 may be formed of sheet metal of varying thicknesses. The rounded end portions 158 of the cover members 38 may substantially mirror the shape of the outer rail 22 and curve towards the floor 26 and/or the support base 170. The cover members 38 may each define a hook 258 extending from the rounded end portions 158 and/or the elongated supports 162. The hooks 258 curved inward, such that an opening 262 of the hook 258 is facing the outer rail 22. It is contemplated that the hooks 258 may be different shapes and/or orientations.

In various examples, a biasing member 266 may extend through the hooks 258. The biasing member 266 may be, for example, a flexible and/or elastic material. The biasing member 266 may allow the cover members 38 to be operable between the raised and lowered positions 218, 222 and the first and second angled positions 230, 234 while acting to bias the cover members 38 to the lowered position 222 (FIG. 6A). It may be advantageous to include the biasing member 266 so the cover members 38 may cover an exposed portion of the track assembly 14. It may be further advantageous to include the biasing member 266 to prevent the cover members 38 from becoming fixed in the raised position 218 and thereby allowing debris to enter the track assembly 14. In additional examples, the track assembly 14 may not include the biasing member 266. In such examples, the weight of the cover members 38 and/or the weight of a floor covering 270 positioned over the cover members 38 may operate to bias the cover members 38 to the lowered position 218.

Referring to FIGS. 8A and 8B, the floor covering 270 may be positioned on the floor 26 and over the track assembly 14. In various examples, the floor covering 270 may be, for example, carpets, fabrics, mats, or any other material or coating positioned over the floor 26. The floor covering 270 may improve the aesthetics of the floor 26 and/or the track assembly 14 and may obscure the track assembly 14 from view of passengers of the vehicle 10. The floor covering 270 may be coupled to the cover members 38. In such examples, the floor covering 270 may be coupled to the cover members 38 via adhesives. Accordingly, the floor covering 270 moves with the cover members 38 between the raised position 218 and the lowered position 222, as illustrated. The floor covering 270 may be advantageous to decrease passenger difficulty with walking and/or moving over the track assembly 14.

Figure 9:
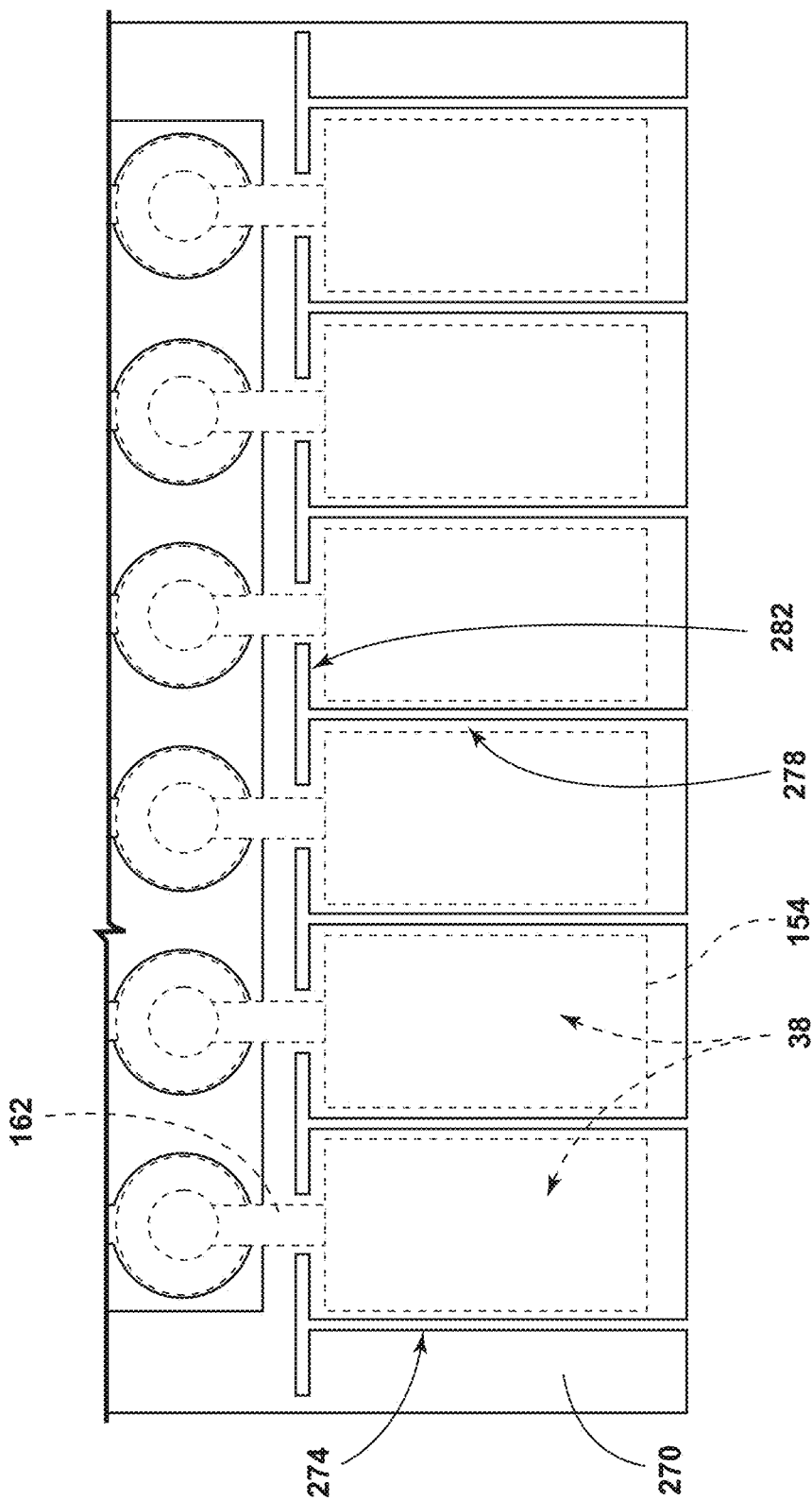
FIG. 9 is a top view of the track assembly having the floor covering, according to one example.

Referring to FIG. 9, as illustrated, the floor covering 270 defined cutouts 274. The cutouts 274 may be, for example, linear, T-shaped, or L-shaped. As shown in FIG. 9, the cutouts 274 are T-shaped and positioned between adjacent cover members 38. The cutouts 274 allow the cover members 38 and the floor covering 270 to move as a single unit, while not hindering the movement of the cover members 38. In various examples, a first portion 278 of each of the cutouts 274 extends parallel to the bodies 154 of the cover members 38. The first portions 278 may be positioned between bodies 154 of adjacent cover members 38 to allow the cover members 38 to move between the raised and lowered positions 218, 222 (FIG. 6A). A second portion 282 of the cutouts 274 may extend perpendicular to the first portions 278 and, as a result, extend perpendicular to the bodies 154 of the cover members 38. The second portions 282 may extend between the elongated supports 162 of adjacent cover members 38. The second portions 282 may allow the cover members 38 to pivot between the first angled position and the second angled position 234 (FIG. 6B). The cutouts 274 may be different shapes and/or sizes based on the desired movement and/or rotation of the cover members 38.

Figure 10A:
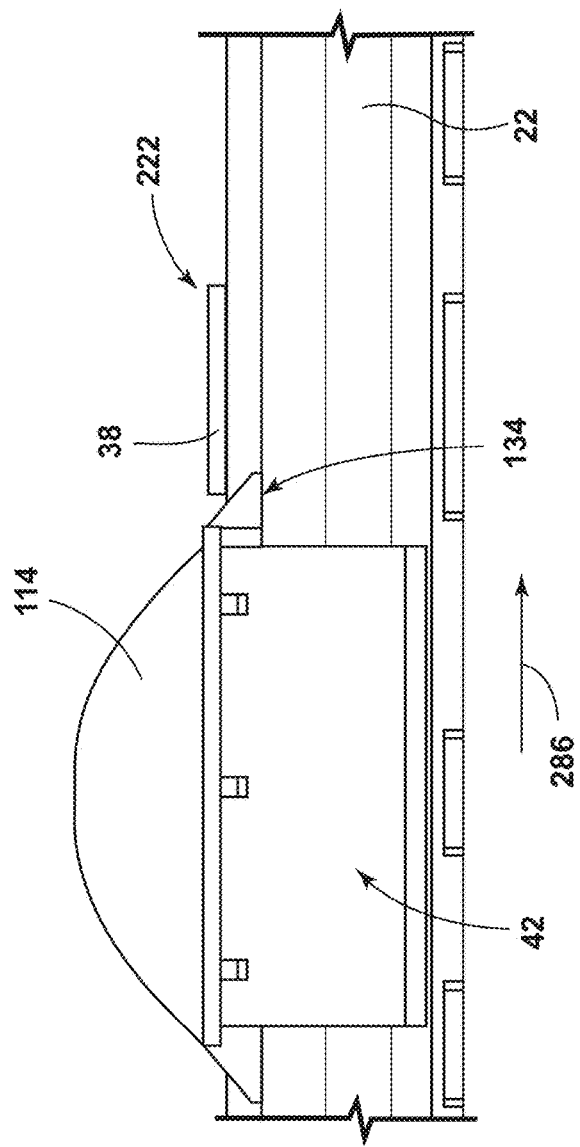
FIG. 10A is a cross-sectional view taken along line X-X of FIG. 7 of the cover member in a lowered position.
Figure 10A:
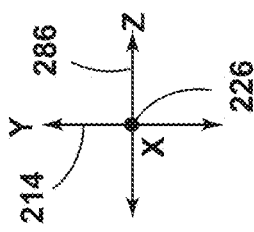
Figure 10B:
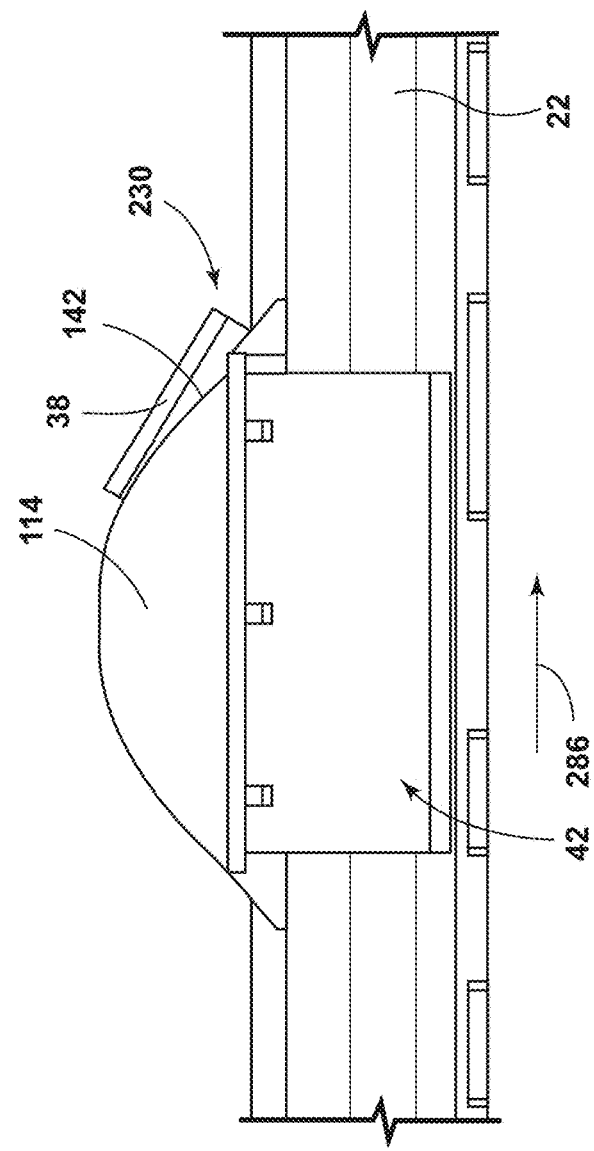
FIG. 10B is a cross-sectional view taken along line X-X of FIG. 7 of the cover member in a first angled position.
Figure 10B:
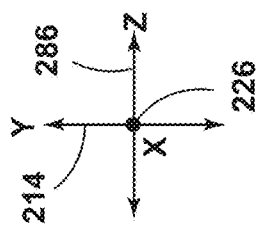

Referring now to FIGS. 10A-10D, in operation, the inclined member 42 may move in the longitudinal direction of the outer rail 22 in conjunction with the inner rail 30. Each cover member 38 may begin in the lowered position 222. Due to the biasing member 266 (FIG. 8A), when unaffected by the inclined member 42, the cover members 38 may be biased to the lowered position 222. As shown in FIG. 10A, the inclined member 42 may move to a position adjacent to the cover member 38. As illustrated, the inclined member 42 is moving in a first longitudinal direction 286 as indicated by the arrow. The lower portion 134 of the arcuate portion 114 may extend under the cover member 38 while the cover member 38 remains in the lowered position 222. As the inclined member 42 moves further in the first longitudinal direction 286, the first angled edge 142 may make contact with the cover member 38. As a result, the cover member 38 may begin to pivot about the second horizontal axis 238 towards the first angled position 230. The first angled position 230 of the cover member 38 may depend on the angle of the incline of the first angled edge 142. A smaller angle of incline of the first angled edge 142 may result in a smaller rotation about the second horizontal axis 238. A smaller angle may be advantageous for allowing the cover members 38 to pivot with less difficulty. A greater angle of incline of the first angled edge 142 may result in a greater rotation about the second horizontal axis 238. As the inclined member 42 moves in the first longitudinal direction 286, the cover member 38 may pivot about the second horizontal axis 238 and the first horizontal axis 226. The angle of rotation about the second horizontal axis 238 and the first horizontal axis 226 may continually change as the inclined member 42 moves further under the cover member 38.

Referring still to FIGS. 10A-10D, the cover member 38 may continue to pivot about the first horizontal axis 226 until it reaches the raised position 218. In such examples, the cover member 38 may contact the top edge 146 of the arcuate portion 114 when in the raised position 218. In various examples, when in the raised position 218 and contacting the top edge 146, the cover members 38 may not be angled in relation to the second horizontal axis 238. The distance the cover member 38 is spaced apart from the upper surface 138 of the outer rail 22 may depend on the height and/or arc of the arcuate portion 114. The top edge 146 of the arcuate portion 114 may be substantially linear to retain the cover member 38 in the raised position 218 as the inclined member 42 moves further in the first longitudinal direction 286. As the inclined member moves, the cover member 38 then contacts the second angled edge 150 of the arcuate portion 114. The cover member 38 may rotate about the second horizontal axis 238 towards the second angled position 234. Similar to the first angled position 230, the second angled position 234 may depend on the angle of the incline of the second angled edge 150. The cover member 38 may begin to pivot about the first horizontal axis 226 as the inclined member 42 continues to move in the first longitudinal direction 286 until the cover member 38 contacts the upper surface 138 of the outer rail 22. In various examples, the cover members 38 are configured to pivot about the first horizontal axis 226 and the second horizontal axis 238 simultaneously. The cover members 38 may not be configured to rotate about the vertical axis 214 as it may affect the rotation of adjacent cover members 38.

As illustrated in FIGS. 10A-10D, a single cover member 38 is shown pivoting about two rotational axes (e.g., the first and second horizontal axes 226, 238). However, it is contemplated that, in operation, the track assembly 14 can include multiple cover members 38 as shown in FIG. 7 with each cover member 38 pivoting and/or operating as discussed herein. The cover members 38 may each pivot independently of adjacent cover members 38. In various examples, the cover members 38 may remain in the lowered position 218 until the inclined member 42 contacts the individual cover member 38. The cover members 38 in immediate proximity of the inclined member 42 may pivot while other cover members 38 remain in the lowered position 218. The individual cover members 38 that are in immediate proximity of the inclined member 42 may be the cover members 38 in direct physical contact with the inclined member 42. Additionally or alternatively, the cover members 38 adjacent to the cover members 38 that are in direct physical contact with the inclined member 42 may also be in immediate proximity of the inclined member 42. In such examples, the each cover member 38 may pivot about two rotational axes when in contact with the inclined member 42 and separately of other cover members 38.

Use of the present disclosure may provide a variety of advantages. In a first example, the track assembly 14 may operate to prevent debris from entering the outer and/or inner rails 22, 30, which may provide for improved operation of the track assembly 14. In a second example, the track assembly 14 may operate to obscure the view of the outer and inner rails 22, 30, which can improve the aesthetics of the interior 46 of the vehicle 10. In a third example, the track assembly 14 as disclosed herein may operate to increase the ease in which passengers to walk over the track assembly 14 to more vehicle-rearward seating rows.

According to various examples, a vehicle includes an outer rail coupled to a floor. An inner rail is positioned within the outer rail. A seat base is coupled to the inner rail. Cover members are positioned over the outer rail. An inclined member is coupled to the outer rail and the cover members are configured to pivot about two rotational axes in response to movement of the inclined member. Embodiments of the present disclosure may include one or a combination of the following features:

- a floor covering positioned over the cover members;
- a support base comprising protrusions and positioned adjacent to the outer rail, wherein the protrusions define sockets;
- the cover members comprise rounded pivot members configured to rotate within the sockets;
- the cover members comprise hooks;
- a biasing member extending through the hooks and configured to bias the cover members to a lowered position;
- an upper surface of the outer rail is flush with the floor;
- the cover members pivot between a raised position and a lowered position;

the cover members pivot between a first angled position and a second angled position;
a retaining member positioned over the rounded pivot members and coupled to the support base;
the retaining member defines slots to accommodate elongated supports extending from bodies of the cover members;
a lower portion of the inclined member is positioned below an upper surface of the outer rail;
the inner rail is configured to be coupled to a seating assembly within a vehicle;
the cover members pivot independently;
linkages coupling the cover members;
an inclined member coupled to the inner rail;
the inclined member comprises a horizontal portion and an arcuate portion; and
the outer rail is configured to be coupled to a floor of a vehicle.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
an outer rail coupled to a floor;
an inner rail positioned within the outer rail;
a seat base coupled to the inner rail;
cover members positioned over the outer rail; and
an inclined member coupled to the inner rail, wherein the cover members are configured to pivot about two rotational axes in response to movement of the inclined member.

2. The vehicle of claim 1, further comprising:
a floor covering positioned over the cover members.

3. The vehicle of claim 1, further comprising:
a support base comprising protrusions and positioned adjacent to the outer rail, wherein the protrusions define sockets.

4. The vehicle of claim 3, wherein the cover members comprise rounded pivot members configured to rotate within the sockets.

5. The vehicle of claim 1, wherein the cover members comprise hooks.

6. The vehicle of claim 5, further comprising:
a biasing member extending through the hooks and configured to bias the cover members to a lowered position.

7. The vehicle of claim 1, wherein an upper surface of the outer rail is flush with the floor.

8. A track assembly for a vehicle seat, comprising:
an outer rail;
an inner rail positioned within the outer rail;
an inclined member coupled to the inner rail;
a support base positioned adjacent to the outer rail and defining sockets; and
cover members positioned over the outer rail and comprising rounded pivot members,
wherein the cover members pivot about two rotational axes.

9. The track assembly for a vehicle seat of claim 8, wherein the cover members pivot between a raised position and a lowered position.

10. The track assembly for a vehicle seat of claim 8, wherein the cover members pivot between a first angled position and a second angled position.

11. The track assembly for a vehicle seat of claim 8, further comprising:
a retaining member positioned over the rounded pivot members and coupled to the support base.

12. The track assembly for a vehicle seat of claim 11, wherein the retaining member defines slots to accommodate elongated supports extending from bodies of the cover members.

13. The track assembly for a vehicle seat of claim 8, wherein a lower portion of the inclined member is positioned below an upper surface of the outer rail.

14. The track assembly for a vehicle seat of claim 8, wherein the inner rail is configured to be coupled to a seating assembly within a vehicle.

15. A track assembly for a vehicle seat, comprising:
an outer rail;
an inner rail positioned within the outer rail;
an inclined member coupled to the inner rail;
a support base positioned adjacent to the outer rail and defining sockets; and
cover members positioned over the outer rail and comprising rounded pivot members positioned within the sockets.

16. The track assembly for a vehicle seat of claim 15, wherein the cover members pivot independently.

17. The track assembly for a vehicle seat of claim 15, further comprising:
linkages coupling the cover members.

18. The track assembly for a vehicle seat of claim 15, wherein the inclined member comprises a horizontal portion and an arcuate portion.

19. The track assembly for a vehicle seat of claim 15, wherein the outer rail is configured to be coupled to a floor of a vehicle.

* * * * *